(12) United States Patent
Mateus

(10) Patent No.: US 8,105,139 B2
(45) Date of Patent: Jan. 31, 2012

(54) AIR CONTROL DEVICE IN PARTICULAR FOR A HEATING VENTILATION AND/OR AIR CONDITIONING INSTALLATION FOR AUTOMOTIVE VEHICLES

(75) Inventor: Micael Mateus, Salto Sao Paulo (BR)

(73) Assignee: Valeo Sistemas Automotivos LTDA, Sao Paulo (BR)

( * ) Notice: Subject to any disclaimer, the term of this patent is extended or adjusted under 35 U.S.C. 154(b) by 1185 days.

(21) Appl. No.: 11/726,139

(22) Filed: Mar. 21, 2007

(65) Prior Publication Data

US 2007/0232215 A1 Oct. 4, 2007

(30) Foreign Application Priority Data

Mar. 24, 2006 (BR) ...................................... 0600845

(51) Int. Cl.
*B60S 1/54* (2006.01)
*B60H 1/00* (2006.01)
*F16K 11/16* (2006.01)
*F16K 3/00* (2006.01)
(52) U.S. Cl. ......... 454/121; 454/139; 137/607; 251/212
(58) Field of Classification Search .................... 454/69, 454/107, 108, 151, 121, 139, 154, 155, 145; 137/607; 251/212
See application file for complete search history.

(56) References Cited

U.S. PATENT DOCUMENTS

| 1,298,136 | A | * | 3/1919 | Wine ............................... 49/95 |
| 2,182,716 | A | * | 12/1939 | Brent ........................... 454/145 |
| 3,783,768 | A | * | 1/1974 | Caming et al. ................. 454/335 |
| 4,253,492 | A | * | 3/1981 | Sullivan .................... 137/601.06 |
| 4,683,913 | A | * | 8/1987 | Hoffman et al. ............ 137/625.4 |
| 5,645,479 | A | * | 7/1997 | Komowski ..................... 454/139 |
| 6,016,976 | A | * | 1/2000 | Kern et al. ...................... 239/503 |
| 6,129,335 | A | * | 10/2000 | Yokogi ........................... 251/212 |
| 6,419,006 | B1 | * | 7/2002 | Loup et al. ........................ 165/42 |
| 6,638,158 | B2 | * | 10/2003 | Walters ........................... 454/121 |
| 6,648,748 | B1 | * | 11/2003 | Ferlin .............................. 454/67 |

(Continued)

FOREIGN PATENT DOCUMENTS

DE 19733052 A1 2/1999

(Continued)

OTHER PUBLICATIONS

English language abstract for DE 10349429 extracted from espacenet.com database, dated Sep. 14, 2010, 13 pages.

(Continued)

*Primary Examiner* — Steven B McAllister
*Assistant Examiner* — Frances H Kamps
(74) *Attorney, Agent, or Firm* — Howard & Howard Attorneys PLLC

(57) ABSTRACT

The present invention refers to an air control device (1), in particular for a heating, ventilation and/or air conditioning installation for automotive vehicles, comprising a housing (3) having two apertures (4, 5). It comprises two dampers (6, 7) with at least one portion of sealing. Dampers (6, 7) have a lower part comprising a U-shaped section (22', 22") defining a groove (39) operating conjointly with a portion having an inverted U shape (46) of housing (3) to create another portion of sealing. Housing (3) has a lower part (30', 30") comprising a groove (47) operating conjointly with a rib (43) disposed on the spiral (13) whereon housing (3) is mounted to define a further portion of sealing.

15 Claims, 10 Drawing Sheets

U.S. PATENT DOCUMENTS

| | | | |
|---|---|---|---|
| 6,799,432 B2 * | 10/2004 | Nagaya et al. | 62/244 |
| 7,174,918 B2 * | 2/2007 | Stevenson et al. | 137/883 |
| 7,470,177 B2 * | 12/2008 | Capellmann et al. | 454/145 |
| 2002/0000254 A1 | 1/2002 | Sato et al. | |
| 2007/0128999 A1 * | 6/2007 | Komowski | 454/155 |
| 2008/0176502 A1 * | 7/2008 | Hashimoto | 454/145 |

FOREIGN PATENT DOCUMENTS

| | | |
|---|---|---|
| DE | 10349429 A1 | 5/2005 |
| FR | 2762890 A1 | 11/1998 |
| JP | 58206411 * | 12/1983 |

OTHER PUBLICATIONS

English language abstract for DE 19733052 extracted from espacenet.com database, dated Sep. 14, 2010, 11 pages.

English language abstract for FR2762890 extracted from espacenet.com database, dated Sep. 14, 2010, 20 pages.

European Search Report for Application No. EP 07104511, dated Jun. 25, 2007, 2 pages.

* cited by examiner

AIR CONTROL DEVICE IN PARTICULAR FOR A HEATING VENTILATION AND/OR AIR CONDITIONING INSTALLATION FOR AUTOMOTIVE VEHICLES

CROSS REFERENCE TO RELATED APPLICATION

This application claims priority to Brazilian Patent Application No. PI 0600845-3 filed on Mar. 24, 2006.

The present invention refers to an air control device, in particular for a heating, ventilation and/or air conditioning installation (HVAC) for automotive vehicles.

HVAC installations generally comprise dampers for the purpose of controlling the opening and closing of air inlet ports. Such dampers may be "butterfly" type dampers, "flag" type dampers, or "barrel port" type dampers. The actual arrangements require perfect hermeticity to prevent air flow escaping from the HVAC installation. Sealing may be achieved by overmolded or foamed parts. However, such sealing parts are difficult to adjust and require various corrective stages until the desired result is achieved. In spite of such endeavors, problems of noise and air leakage persist. In addition, foam or overmolded dampers are more expensive than dampers made from a single material.

Furthermore existing installations require space whilst current requirements are for compact devices.

The present invention relates to an air control device, in particular for a heating, ventilation and/or air conditioning installation for automotive vehicles comprising a housing having a first aperture and a second aperture. It comprises a first and a second damper supported by the housing operating conjointly to open and close apertures having at least a first portion of sealing.

According to a preferred method of embodiment the first damper comprises a tongue operating conjointly with a groove of the second damper to create a first portion of sealing and the first damper comprises a groove operating conjointly with a tongue of the second damper to create a second portion of sealing.

Another characteristic being that the dampers have a lower part comprising a U-shaped section defining a groove and the housing comprises an inverted U-shaped portion operating conjointly with the U-shaped portion of the dampers creating a third portion of sealing, also serving the function of guide for the dampers.

It is advantageous that the U-shaped sections be disposed along the entire periphery of the dampers such as to make constant contact with the U-shaped portion of the housing.

In addition the air control device comprises a spiral whereon the housing is mounted. The housing has a lower part comprising a groove operating conjointly with a rib disposed on the spiral to define a fourth portion of sealing.

Furthermore the dampers are actuated by gears to ensure their simultaneous transmissive movements.

Finally the dampers are curved dampers of hemispherical shape.

Further advantages and a description of the present invention are provided in the statement below referring to the appended drawings provided as a specific method of embodiment of the present invention wherein.

Figure 1:
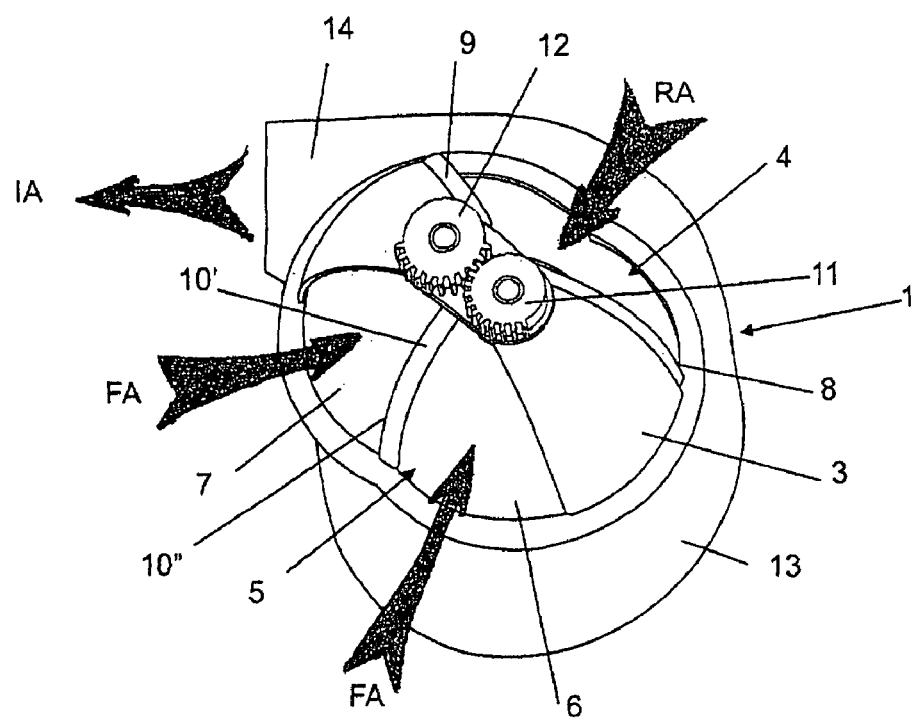
FIG. 1 is a top perspective view of the air flow control device according to the present invention.

As may be observed in the figures, the present invention relates to a device to actuate dampers in an installation, in particular a heating, ventilation and/or air conditioning installation (HVAC). The invention more specifically relates to an air flow control device regulating the opening and closing of at least one airway.

In relation to FIGS. 1 to 4, the present invention is destined for an air flow control device 1 for an airway. Such method of embodiment is particularly employed for air intake equipment in HVAC installations. Such items of equipment comprise at least one flow of fresh air FA and one flow of recycled air RA. The flow of fresh air FA is captured directly from outside the vehicle whilst the flow of recycled air RA derives from within the interior of the vehicle.

Air control device 1 comprises a housing 3 and two apertures 4 and 5, such apertures making it possible for air to enter air control device 1. According to the method of embodiment described aperture 4 permits the intake of the flow of recycled air RA and aperture 5 makes it possible for the flow of fresh air FA to enter air control device 1.

Opening and closing of apertures 4 and 5 is regulated by two dampers 6 and 7. Dampers 6 and 7 are supported by housing 3. More particularly the two dampers 6 and 7 are inserted within housing 3. They are capable of displacement within housing 3 between two distinct extreme positions. In such two extreme positions dampers 6 and 7 operate conjointly to close and/or open apertures 4 and 5.

In a first extreme position aperture 4 is closed by dampers 6 and 7. Consequently the flow of fresh air FA feeds air control device 1. The flow of recycled air RA cannot enter air control device 1. In a second extreme position aperture 5 is closed by dampers 6 and 7. Consequently the flow of fresh air FA cannot enter air control device 1. The flow of recycled air RA feeds air control device 1.

Alternative positions make possible the simultaneous feed of air into air control device 1. According to the positions of dampers 6 and 7, apertures 4 and 5 are open to a greater or lesser extent leading to a flow of fresh air FA or flow of recycled air RA being to a greater or lesser extent powerful. The air flows enter air control device 1.

According to the present invention dampers 6 and 7 are curved dampers of hemispherical shape. Housing 3 has the form of a monoblock part having two hemispherical portions joined by a portion of flat top.

Figure 2:
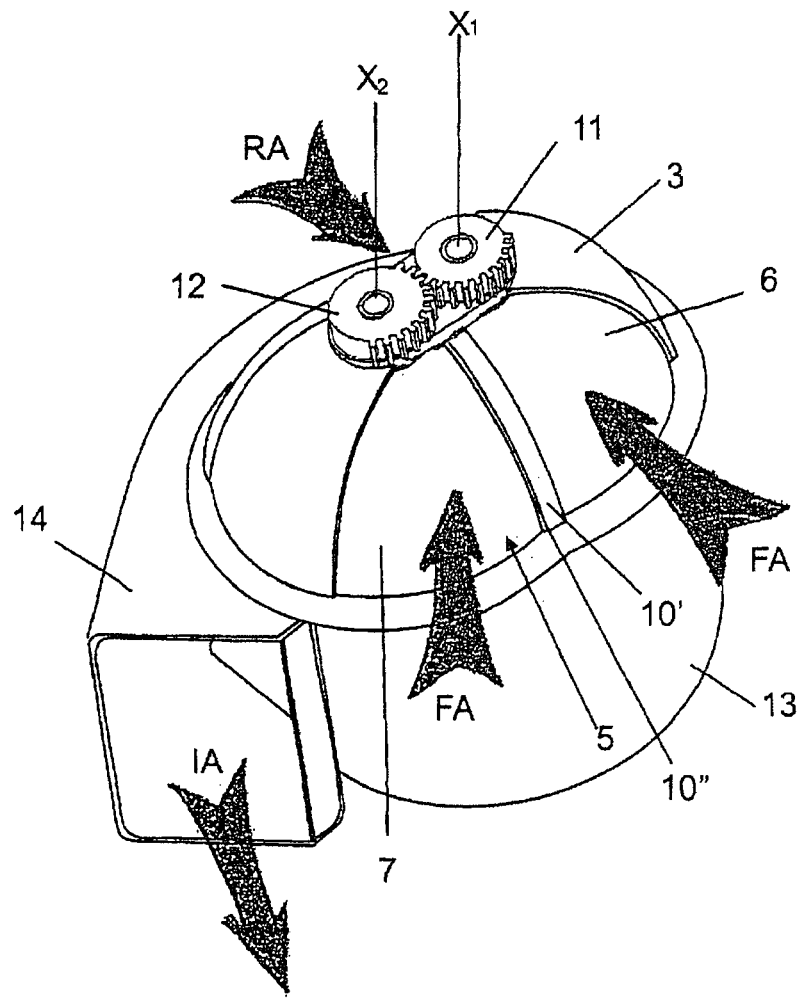
FIG. 2 is a front perspective view of the air flow control device according to the present invention.

In FIGS. 1 and 2 dampers 6 and 7 are closing aperture 5. According to this arrangement only recycled air flow RA may enter air control device 1. Dampers 6 and 7 are in an open position signifying a position for the passage of air for the flow of recycled air RA.

The closure of aperture 5 is achieved through precise conjoint operation between dampers 6 and 7. In fact dampers 6 and 7 comprise tongue and groove sealing elements entering into contact to achieve perfect hermeticity to air on closing aperture 5. The design of such damper will be described in greater detail in relation to FIG. 8.

Tongue and groove sealing elements of dampers 6 and 7 create a part of sealing ensuring perfect closure of aperture 5.

Dampers 6 and 7 are disposed within housing 3 and are actuated by gears 11 and 12. Dampers 6 and 7 will be described in greater detail in relation to FIG. 5.

To ensure perfect simultaneous displacement of dampers 6 and 7 according to the preferred method of embodiment gears 11 and 12 are coupled together.

Consequently rotation of damper 6 leads to rotation of damper 7 in the contrary sense. With such an arrangement dampers 6 and 7 are simultaneously displaced in two contrary rotational senses. The displacement of closing and opening dampers 6 and 7 is achieved through movement of coupled gears 11 and 12.

The use of gears 11 and 12 makes possible a reduction in the number of actuators to regulate opening and closing dampers 6 and 7 of air control device 1. Having a single actuator (not shown in the figures) actuating damper 6 it is possible to permit regulation of the displacement of damper 7. Such actuator may be an electric motor or stepper motors or mechanical cable or shaft, for example a Bowden cable or a flexible shaft.

Housing 3 is mounted on spiral 13 being a portion of air ducting. Spiral 13 includes an impeller 15 to draw air into the air control device 1 and to accelerate the air flow and blow it into the HVAC installation through an outlet port 14 as a flow of injected air IA.

Figure 3:
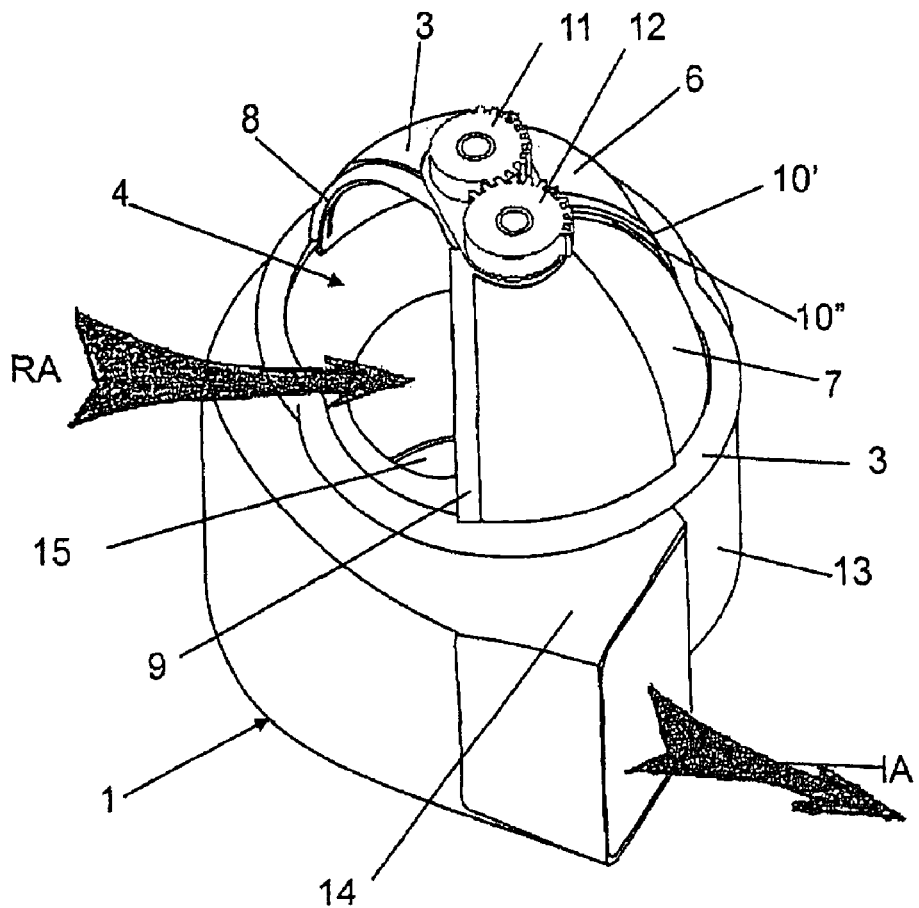
FIG. 3 is a rear perspective view of the air flow control device according to the present invention.

FIG. 3 shows a rear perspective view of the air flow. control device according to the present invention. In this figure aperture 4 is fully open. Recycled air flow RA enters air control device 1 and is drawn through impeller 15. Recycled air flow RA is accelerated by impeller 15 and ejected by means of outlet port 14 as a flow of injected air IA.

Figure 4:
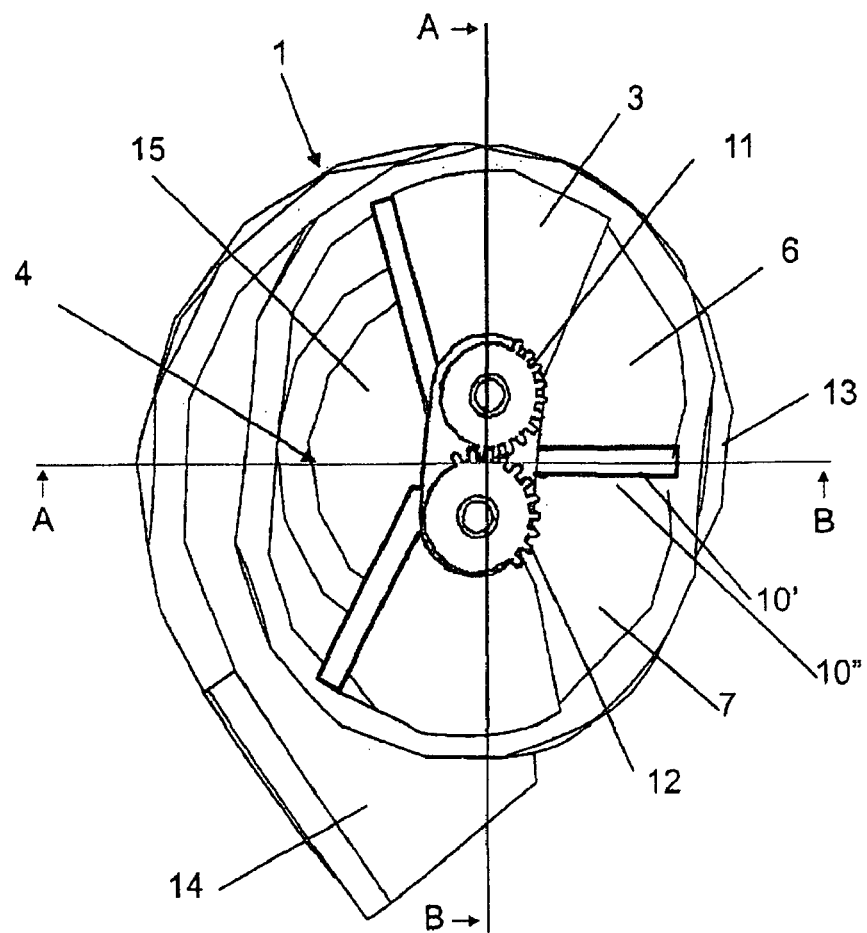
FIG. 4 is a top view of the air flow control device according to the present invention.

FIG. 4 is a top view of an air flow control device according to the present invention. According to the invention flow of recycled air RA and flow of fresh air FA are drawn in a horizontal direction in relation to the spiral into air control device 1. Such air flows are then directed in a vertical direction in relation to the spiral, entering the impeller. They are then accelerated in a rotational sense within spiral 13. Resultant air flow IA is ejected by means of outlet port 14.

Figure 5:
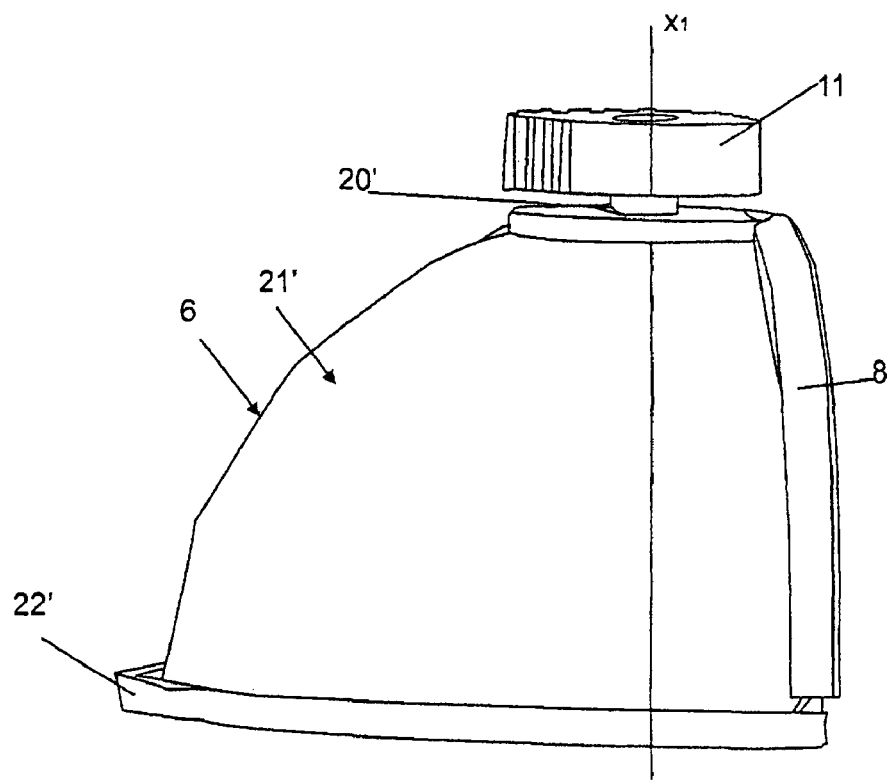
FIG. 5 is a side view of a damper according to the present invention.

Reference is now made to FIG. 5 showing a side view of a damper according to the present invention. Damper 6 comprises a hemispherical cap 21'. The lower part of cap 21' has a U-shaped section 22'. U-shaped section 22' operates conjointly with housing 3 to ensure sealing of the lower part of damper 6 and to serve as guide for its lower part. In addition cap 21' has a tongue 8 in its lateral region. The opposite side of the cap has a groove 10'.

Damper 7 has a structure analogous to damper 6. Damper 7 comprises a hemispherical cap 21". The lower part of cap 21" has a U-shaped section 22". U-shaped section 22" operates conjointly with housing 3 to ensure sealing and to serve as guide for the lower part of damper 7. In addition cap 21" has a tongue 10" in its lateral region. The opposite side of the cap has a groove 9.

U-shaped sections 22' and 22" run along the entire periphery of dampers 6 and 7 curved in a hemispherical shape.

Tongues 8 and 10" and grooves 9 and 10' are present at both extremities of dampers 6 and 7 for sealing in the external air position wherein air is admitted from without the ventilated compartment and in the recirculation position wherein air is captured internally from within the ventilated compartment. Conjoint operation of tongue 8 and groove 9 creates a first portion of sealing between dampers 6 and 7. In the same manner conjoint operation of tongue 10" and groove 10' creates a second portion of sealing between dampers 6 and 7.

Dampers 6 and 7 may be identical and come from the same mould.

Consequently when dampers 6 and 7 have concluded closing aperture 5 of air control device 1, groove 10' of damper 6 operates conjointly with tongue 10" of damper 7. This creates one part of a junction the function whereof is to ensure hermetic air sealing.

In the other extreme position dampers 6 and 7 operate conjointly to close aperture 4 of air control device 1, dampers 6 and 7 having concluded closing aperture 4 of air control device 1. Tongue 8 of damper 6 operates conjointly with groove 9 of damper 7. This creates one part of a junction the function whereof is to ensure hermetic air sealing.

Damper 6 comprises at its top part an annular shaft 20' operating conjointly with the upper part of housing 3 creating an axis of rotation XI. At the extremity of annular shaft 20' there is disposed gear 11 actuating damper 6.

Similarly damper 7 includes at its top part an annular shaft 20" operating conjointly with the upper part of housing 3 creating an axis of rotation X2. At the extremity of annular shaft 20" there is disposed gear 12 actuating damper 7.

Figure 6:
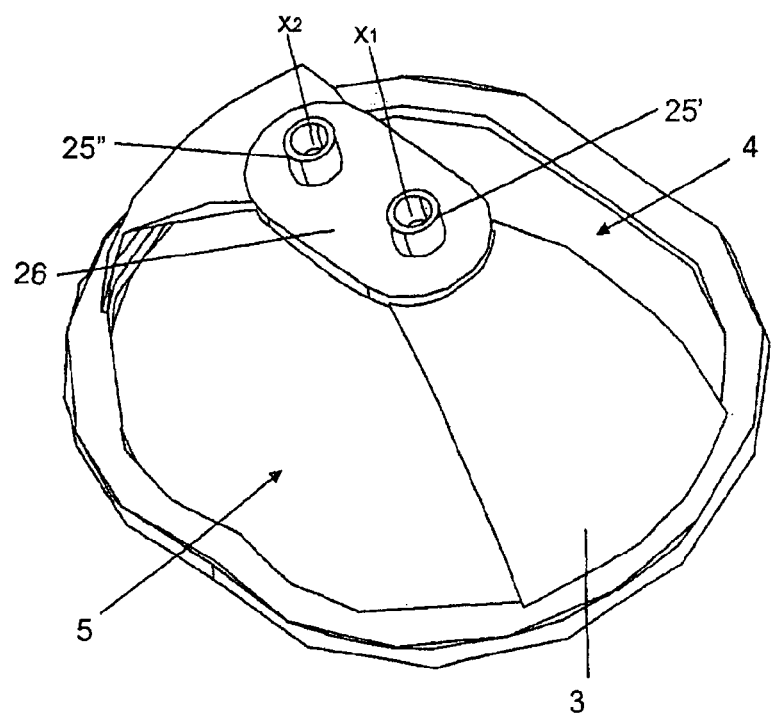
FIG. 6 is a perspective view of the support for the dampers in the air flow control device without the dampers according to the present invention.

Making reference to FIG. 6, housing 3 of air control device 1 has an upper part 26 comprising two annular tubes 25' and 25". Annular shaft 20' of damper 6 and annular shaft 20" of damper 7 are respectively inserted into annular tubes 25' and 25". This particular arrangement makes possible the creation of precise conjoint operation between dampers 6 and 7 and housing 3. In addition it creates two axes of rotation XI and X2 for the respective rotations of dampers 6 and 7. U-shaped sections 22' and 22" of dampers 6 and 7 respectively operate conjointly with housing 3 achieving sealing and guiding making possible the maintenance of axes XI and D2 throughout the entire rotation of dampers 6 and 7.

Figure 7:
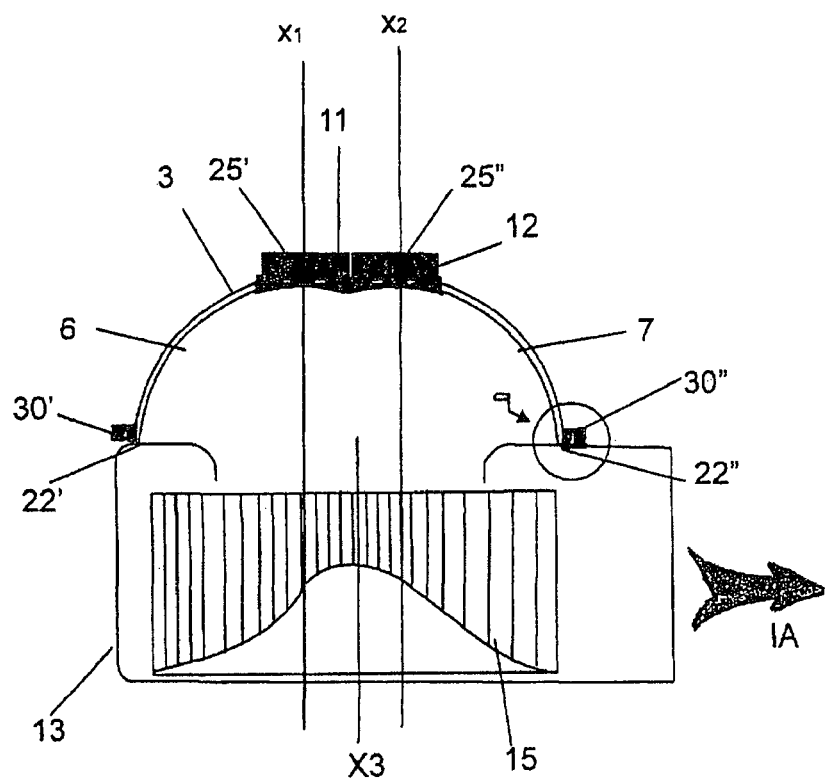
FIG. 7 is a sectional view along A-A in FIG. 4.

Reference is now made to FIG. 7 being a sectional view along line A-A in FIG. 4. In this configuration aperture 5 of air control device 1 is closed by dampers 6 and 7. Dampers 6 and 7 have been displaced to close aperture 5 through conjoint operation. Flow of recycled air RA enters control device 1 and is drawn by impeller 15 having a rotational movement around axis X3. Axis X3 is preferably parallel to axes of rotation XI and X2 of dampers 6 and 7.

Dampers 6 and 7 closely operate conjointly with the lower part of housing 3. As shown in FIG. 7 U-shaped section 22' of damper 6 meshes with tongue 39 provided in the lower part of housing 3. Similarly U-shaped section 22" of damper 7 meshes with an analogous tongue provided in the lower part of housing. 3. Such arrangement will be described in greater detail in relation to FIG. 10.

Figure 8:
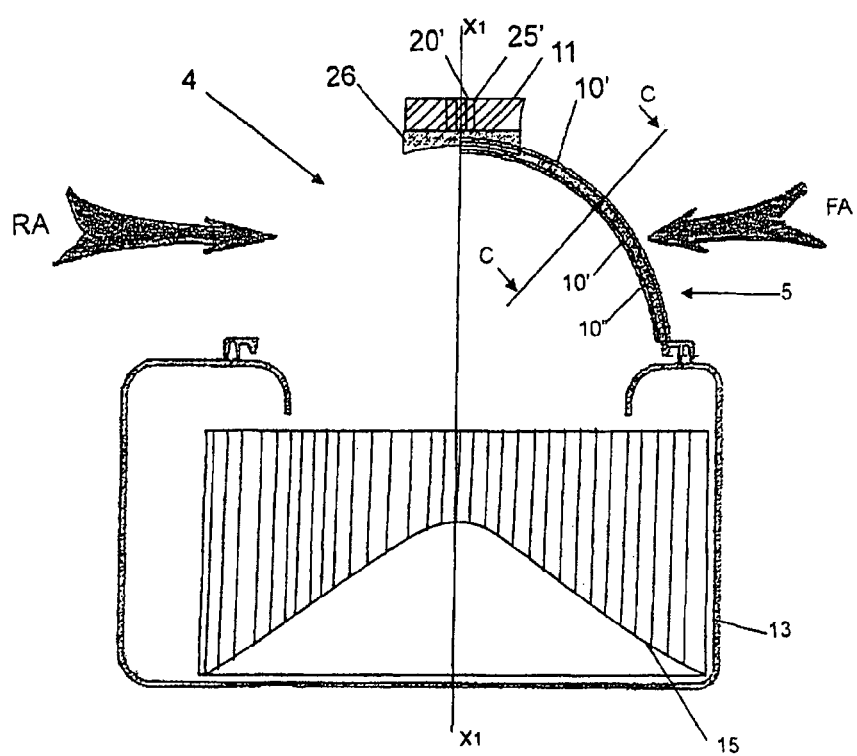
FIG. 8 is a sectional view along B-B in FIG. 4.

FIG. 8 is a sectional view along line B-B in FIG. 4. The arrangement of FIG. 8 is a configuration wherein aperture 5 is closed by conjoint operation between dampers 6 and 7. In particular groove 10' of damper 6 meshes with tongue 10" of damper 7. This creates a partial junction, the function whereof is to ensure hermetic sealing to air. Such close conjoint operation is detailed in FIG. 9.

Figure 9:
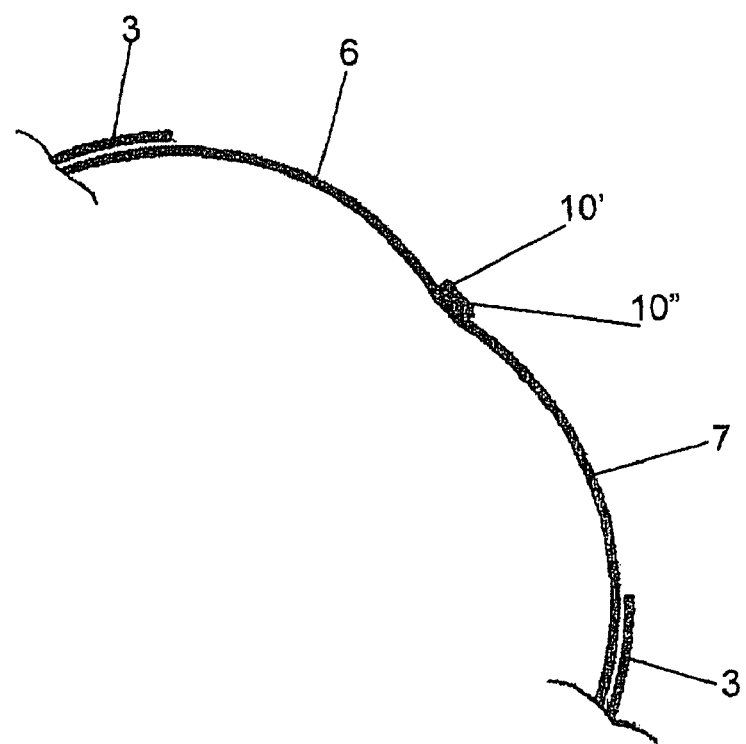
FIG. 9 is a sectional view along C-C in FIG. 4.

FIG. 9 is a sectional view along line C-C in FIG. 8. This figure particularly details the conjoint operation between groove 10' of damper 6 and tongue 10" of damper 7. Such conjoint operation is an interaction between groove 10' of damper 6 and tongue 10" of damper 7 ensuring perfect sealing of dampers 6 and 7 and preventing any escape of air between dampers 6 and 7.

Figure 10:
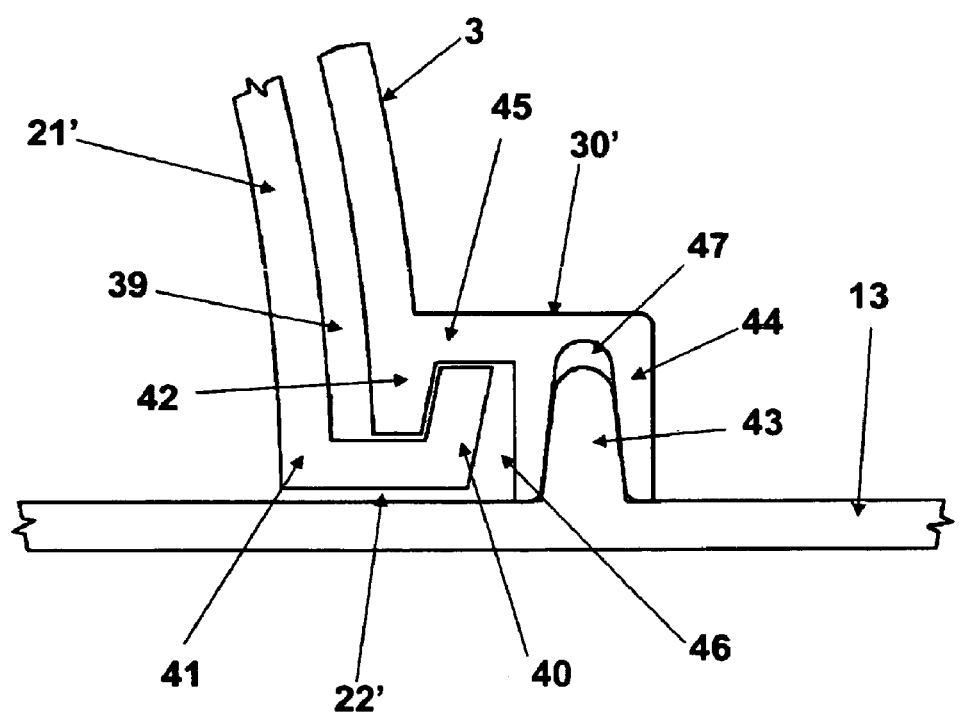
FIG. 10 is a magnified view of detail D in FIG. 7.

In addition to such conjoint operation between dampers 6 and 7 sealing is ensured in addition by conjoint operation between dampers 6 and 7 and the lower part of housing 3. FIG. 10 is a magnified view of the details of FIG. 7.

Consequently sealing is also achieved between the lower parts of dampers 6 and 7 and housing 3 and spiral 13. As described in relation to FIG. 5 damper 6 comprises a cap 21' with a U-shaped section 22' disposed at the lower part of cap 21'. In a respective manner damper 7 comprises cap 21" with a U-shaped section 22" provided at the lower part of cap 21".

U-shaped section 22' of damper 6 comprises a lower section 41 and a prolonged external portion 40. Lower section 41 joins cap 21' of damper 6 to prolonged external section 40. This creates a shaped section having groove 39. Lower section 41 and the prolonged external portion 40 are located along the entire periphery of cap 21'. U-shaped section 22' is consequently defined along the entire periphery of cap 21'. Consequently groove 39 is created around the entire lower part of damper 6. An analogous arrangement is provided in the lower part of damper 7.

In FIG. 7 the housing comprises a lower part 30'. Such lower part 30' includes a tongue 42 extending downwards commencing from the extremity of housing 3. It also includes a lateral wall 44 and a joining portion 45. Lateral wall 44, joining portion 45 and tongue 42 define a section 46 having an inverted U shape.

To ensure sealing and hermeticity to air of air control device 1 the external portion 40 of U-shaped section 22' of damper 6 is inserted into section 46 having an inverted U shape of housing 3. Additionally tongue 42 of housing 3 is inserted into groove 39 created around the entire lower part of damper 6. Conjoint operation between U-shaped section 22' of damper 6 and section 46 having an inverted U shape of housing 3 creates a third portion of sealing. An analogous portion of sealing is created between damper 7 and housing 3.

Furthermore lateral wall 44 of housing 3 comprises a groove 47. Such groove 47 operates conjointly with rib 43 disposed on the external surface of spiral 13. Conjoint operation between groove 47 and rib 43 constitutes a fourth portion of sealing. This creates a barrier to passage of air. Analogous arrangements are provided on damper 7.

Consequently dampers 6 and 7 are sealed during their overall displacement in the lower portion. As another function U-shaped portions disposed on the lower parts of dampers 6 and 7 and on housing 3 exercise the function of damper guide, preventing this latter getting out of position during displacement between the positions of external and recirculation air.

Such conjoint operation of U-shaped section 22' of damper 6 with inverted U-shaped section 46 of housing 3 creates a guide for damper 6. Such guide is utilized to maintain damper 6 in position during rotation around axis XI. Tongue 42 of the housing has a dimension similar to that of portion 40. Lower section 41 may rest on the wall of spiral 13 restricting its movement. When this occurs groove 39 still holds tongue 42 along its whole length.

Consequent upon this method of sealing requirement for an injection process for the overmolded component made from elastomeric material (foam, rubber) is eliminated.

The preferred method of embodiment is described as an air control device for an HVAC installation. However the present invention may be used in any installation wherein one or more air flows require to be regulated for the purpose of opening or closing air paths.

Furthermore the preferred method of embodiment is described as having two curved dampers of hemispherical shape operating conjointly. However such dampers may be indifferently "barrel port" type dampers or "butterfly" type dampers. What is most important is the conjoint operation between the two dampers to create perfect sealing between them.

The invention claimed is:

1. An air control device, for a heating, ventilation and/or air conditioning installation for an automotive vehicle, comprising a ventilation housing having a first aperture and a second aperture, a first damper and a second damper which are supported by the housing, the first and second dampers being operated conjointly to open and close apertures with the first and second dampers coming into a sealing contact with each other to close either of the apertures, and characterized in that the first and second dampers have a bottom edge comprising a U-shaped section defining a groove mating with a portion of the housing in the shape of an inverted U-shaped section to create a sliding sealing portion.

2. An air control device according to claim 1 characterized in that the first damper comprises a tongue operating conjointly with a groove of the second damper to create a first portion of sealing.

3. An air control device according to claim 2 characterized in that the first damper comprises a groove operating conjointly with a tongue of the second damper to create a second portion of sealing.

4. An air control device according to claim 1 characterized in that the U-shaped section is disposed along the bottom edge of the first and second dampers such as to make constant contact with the mating portion of the housing in the form of the inverted U-shaped section of the housing.

5. An air control device according to claim 1 characterized in that the air control device comprises a fan volute housing whereon the housing is mounted.

6. An air control device according to claim 5 characterized in that the housing has a lower part comprising a groove operating conjointly with a rib disposed on the fan volute housing to define a fourth portion of sealing.

7. An air control device according to claim 1 characterized in that the first and second dampers are actuated by gears to ensure their simultaneous transmissive movements.

8. An air control device according to claim 1 characterized in that the first and second dampers are curved dampers of partial hemispherical shape.

9. An air control device according to claim 2 characterized in that the U-shaped section is disposed along the bottom edge of the first and second dampers such as to make constant contact with the mating portion of the housing in the form of the inverted U-shaped section of the housing.

10. An air control device according to claim 3 characterized in that the U-shaped section is disposed along the bottom edge of the first and second dampers such as to make constant contact with the mating portion of the housing in the form of the inverted U-shaped section of the housing.

11. An air control device, in particular for a heating, ventilation and/or air conditioning installation for an automotive vehicle, comprising a ventilation housing having a first aperture and a second aperture, a first damper and a second damper which are supported by the housing, with the first and second dampers being operated conjointly to open and close apertures with the first and second dampers coming into a sealing contact with each other to close either of the apertures, and with each of the first and second dampers having a bottom edge comprising a U-shaped section defining a groove for providing a sliding sealing portion engaging the housing.

12. Air control device according to claim 11 wherein the first damper comprises a tongue operating conjointly with a groove of the second damper to create a first portion of sealing.

13. Air control device according to claim 12 wherein the first damper comprises a groove operating conjointly with a tongue of the second damper to create a second portion of sealing.

14. An air control device according to claim 13 wherein a portion of the housing comprises a shape of an inverted U-shaped section that mates with the bottom edge of the first and the second dampers to create a third sealing portion.

15. Air control device according to claim 14 further comprising a fan volute housing having a rib and the housing has a lower part comprising a groove operating conjointly with the rib to define a fourth portion of sealing.

\* \* \* \* \*